United States Patent
Dimand

(10) Patent No.: US 6,612,615 B1
(45) Date of Patent: Sep. 2, 2003

(54) TRAILER HITCH CART ATTACHMENT MECHANISM

(76) Inventor: Eldad Dimand, 5510 Noble Ave., Sherman Oaks, CA (US) 91411

( * ) Notice: Subject to any disclaimer, the term of this patent is extended or adjusted under 35 U.S.C. 154(b) by 120 days.

(21) Appl. No.: 09/966,153

(22) Filed: Sep. 28, 2001

(51) Int. Cl.⁷ .................................................. B60R 9/00
(52) U.S. Cl. ........................ 280/769; 224/531; 224/547; 224/548; 224/551
(58) Field of Search ........................................ 280/769

(56) References Cited

U.S. PATENT DOCUMENTS

| | | | | |
|---|---|---|---|---|
| 3,716,253 A | * | 2/1973 | Gniffke et al. ............ | 280/416.2 |
| 3,815,936 A | * | 6/1974 | Oaks, Jr. .................. | 280/417.1 |
| 3,896,949 A | * | 7/1975 | Shipley ..................... | 414/563 |
| 4,340,240 A | * | 7/1982 | Anderson ................. | 280/461.1 |
| 4,502,706 A | * | 3/1985 | Frambach, Sr. .......... | 280/416.2 |
| 5,458,389 A | * | 10/1995 | Young ...................... | 296/26.08 |
| 5,489,110 A | * | 2/1996 | Van Dusen .............. | 280/415.1 |
| 5,690,182 A | * | 11/1997 | Ward ........................ | 172/439 |
| 5,797,614 A | * | 8/1998 | Hord et al. ............... | 280/417.1 |
| 5,950,890 A | * | 9/1999 | Darby ....................... | 224/402 |
| 6,129,371 A | * | 10/2000 | Powell ..................... | 280/461.1 |

* cited by examiner

*Primary Examiner*—Kevin Hurley
*Assistant Examiner*—Paul Royal, Jr.
(74) *Attorney, Agent, or Firm*—Goldstein & Lavas, P.C.

(57) ABSTRACT

A cart attachment system, for attaching a cart to a vehicle, the vehicle having a trailer hitch, including a carrier and a V-bracket. The V-bracket is attached to the cart, and has an underside hollow. The carrier includes a main tube which extends vertically and which is attached to the trailer hitch with an L-adapter that is rigidly affixed to the main tube. A slidable member is mounted for vertical movement within the main tube. A triangular support member is mounted to the main tube and fits within the hollow of the V-bracket, such that the triangular support member is raised by raising the slidable member to lift the V-bracket which in turn lifts the cart off the ground for transport. When the destination is reached, the cart is easily lowered to the ground by lowering the slidable member and thereby lowering the triangular support member.

12 Claims, 4 Drawing Sheets

TRAILER HITCH CART ATTACHMENT MECHANISM

BACKGROUND OF THE INVENTION

The invention relates to a trailer hitch cart attachment mechanism. More particularly, the invention relates to a mechanism which attaches to a trailer hitch receiving tube, and is capable of supporting a utility cart, and raising the utility cart above the ground for transport.

Many occupations and endeavors are aided by the use of a utility cart. For example, construction workers often use a utility cart to transport construction materials, supplies, and tools. In many occupations, the cart can greatly reduce the amount of labor that must be expended carrying materials around—in other occupations it is truly indispensable.

The problem with such carts, is that often the larger they are, the more useful they are. However, the larger the cart, the more difficult it is to transport the cart from job to job or location to location.

U.S. Pat. No. 5,738,261 to Dula and U.S. Pat. No. 5,522,530 to Boettcher both disclose devices which mount a hand truck to a vehicle. However, hand trucks have only limited usefulness. They are not suitable for carrying small or loose articles. In addition, these patents describe a device which attaches directly to the vehicle bumper, and thus requires installation and extensive vehicle modification.

U.S. Pat. No. 4,744,590 to Chesney discloses a removably attachable suspended trailer, which extends directly outward from the trailer hitch. However, Chesney requires that the wheels be removed in order for the cart to be transported.

U.S. Pat. No. 5,567,107 to Bruno discloses a device for securing and loading cargo onto a vehicle. However, Bruno employs a very complex construction to lift a load above the ground.

U.S. Pat. No. 5,011,361 to Peterson discloses a vehicle mountable carrier for a three wheeled scooter. However, Peterson attaches directly to the bumper, and employs a very complex mechanism for raising and lowering the scooter.

While these units may be suitable for the particular purpose employed, or for general use, they would not be as suitable for the purposes of the present invention as disclosed hereafter.

SUMMARY OF THE INVENTION

It is an object of the invention to produce a cart attachment carrier which facilitates attachment of a cart to a vehicle trailer hitch. Accordingly, the mechanism has a horizontal male tube which extends and fastens within the trailer hitch receiver tube of a vehicle and provides support for the cart thereby.

It is another object of the invention to allow the cart to be transported without the wheels of the cart contacting the ground surface yet without requiring the removal of the wheels from the cart. Accordingly, the cart is easily lifted prior to moving the vehicle and is easily lowered at the intended destination.

It is a further object of the invention to allow the cart to easily engage and disengage with carrier. Accordingly, the cart has an open V-bracket which is engaged by a triangular support member on the carrier to both lift and secure the cart to the carrier.

It is a still further object of the invention that the carrier is easy to operate. Accordingly, the carrier lifts and lowers the triangular support member by simply rotating a handle.

The invention is a cart attachment system, for attaching a cart to a vehicle, the vehicle having a trailer hitch, including a carrier and a V-bracket. The V-bracket is attached to the cart, and has an underside hollow. The carrier includes a main tube which extends vertically and which is attached to the trailer hitch with an L-adapter that is rigidly affixed to the main tube. A slidable member is mounted for vertical movement within the main tube. A triangular support member is mounted to the main tube and fits within the hollow of the V-bracket, such that the triangular support member is raised by raising the slidable member to lift the V-bracket which in turn lifts the cart off the ground for transport. When the destination is reached, the cart is easily lowered to the ground by lowering the slidable member and thereby lowering the triangular support member.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
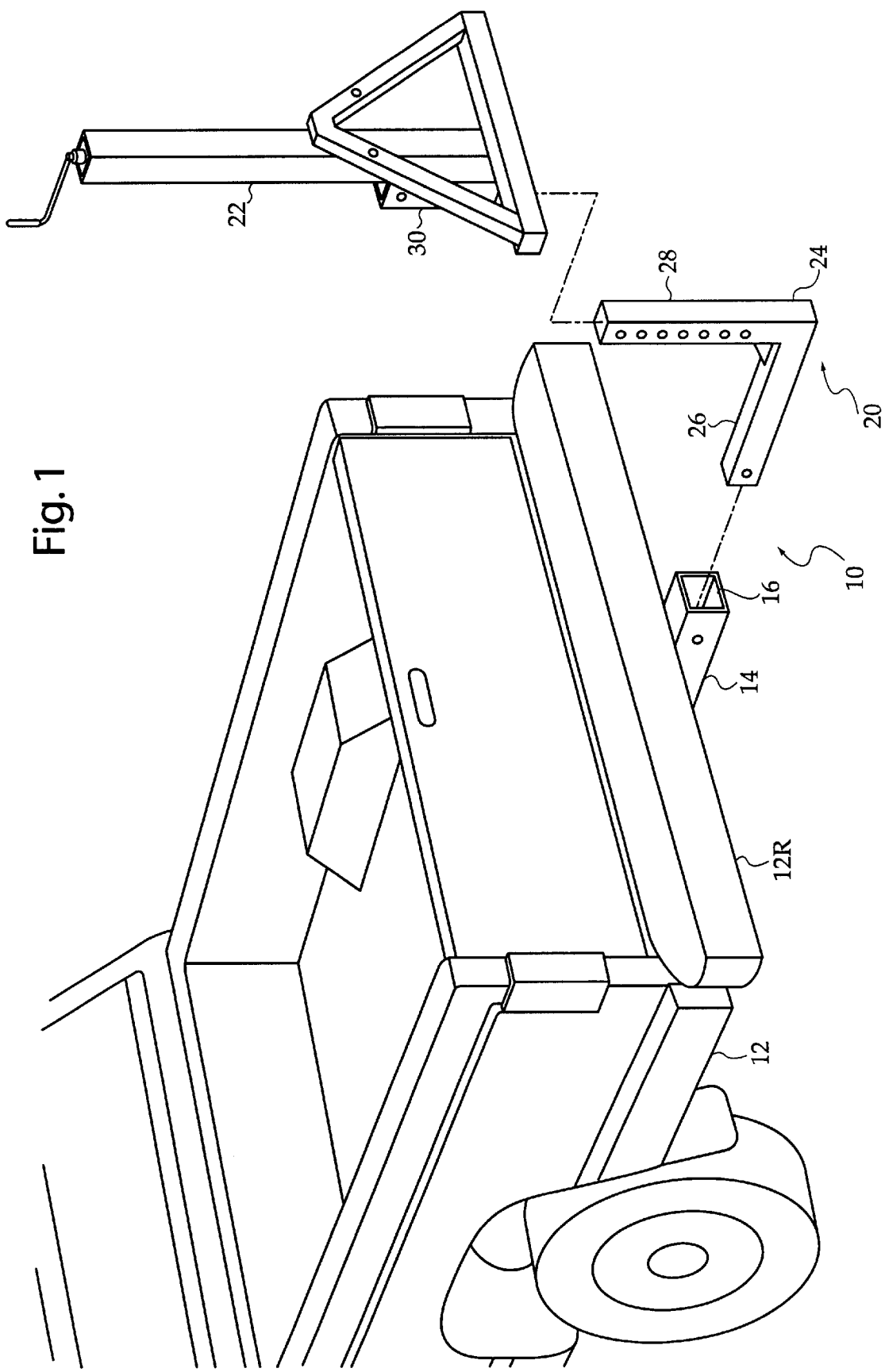
FIG. 1 is a diagrammatic exploded perspective view, illustrating various components of the carrier attached to a vehicle trailer hitch.

FIG. 1 illustrates a cart attachment system 10, for use with a vehicle 12, having a vehicle rear 12R, wherein a trailer hitch 14 having a female receiver tube 16 is located at the vehicle rear 12R. The cart attachment system 10 includes a carrier 20, which secures to the vehicle 12 by attaching to the trailer hitch 14.

The carrier 20 includes a jack housing 22, and an L-adapter 24. The L-adapter 24 is a strong, rigid member which has a horizontal portion 26 which extends into the receiver tube 16 of the trailer hitch, and a vertical portion 28 which mates with the jack housing 22. More particularly, the jack housing 22 has a jack housing attachment tube 30, and the vertical portion 28 of the L-adapter 24 selectively extends within the jack housing attachment tube 30 as indicated by the projection lines in FIG. 1.

Figure 2:
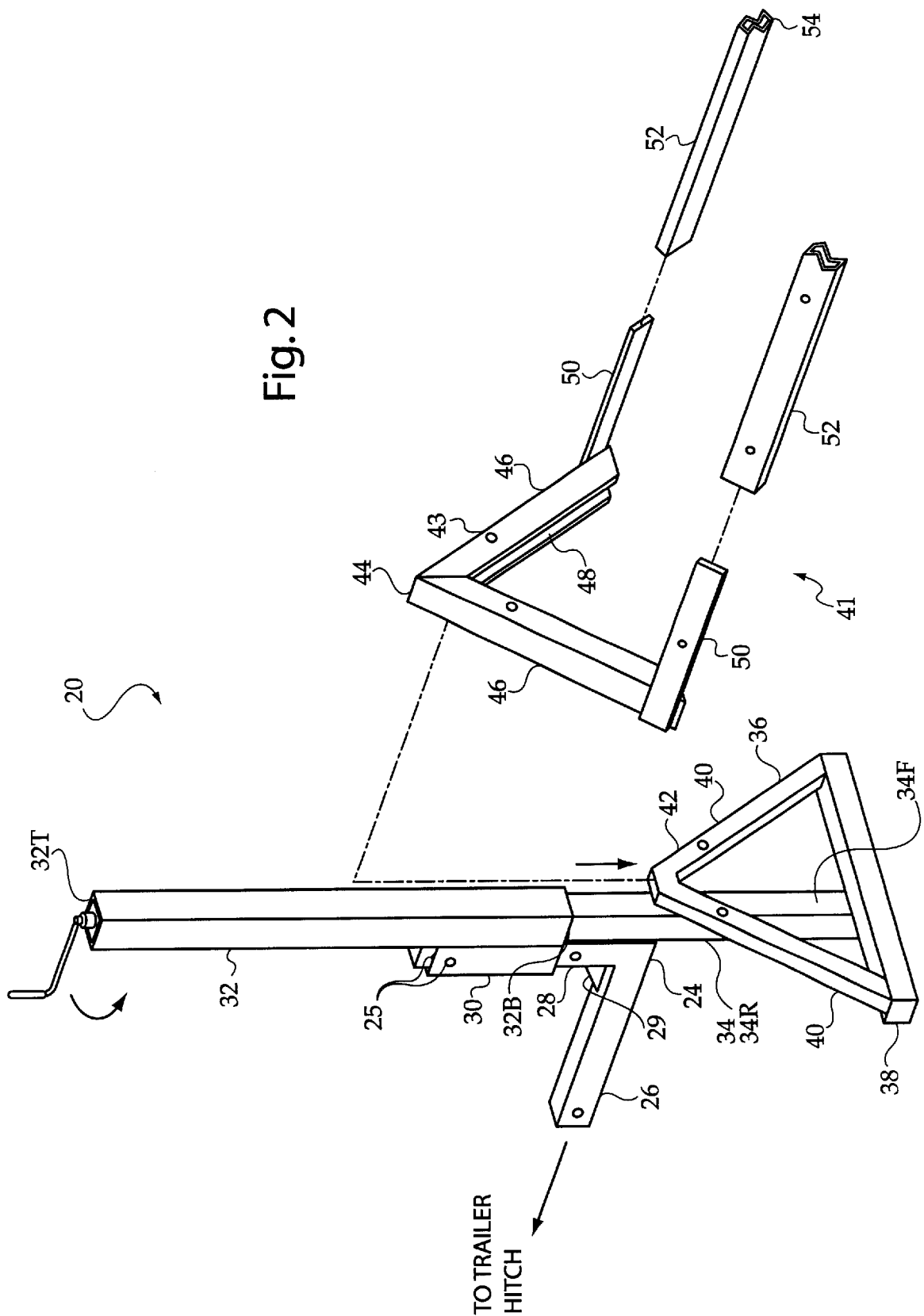
FIG. 2 is a diagrammatic exploded perspective view, illustrating components of the cart adapter interfaced with the carrier.

FIG. 2 further details the carrier 20, and shows how the vertical portion 28 of the L-adapter 24 is mounted within the jack housing attachment tube 30. The jack housing 22 further has a main tube 32 which extends vertically, is fastened directly to the jack housing attachment tube 30, and extends parallel thereto. The main tube 32 has a main tube top 32T and a main tube bottom 32B. As seen in FIG. 1 and FIG. 2, matching adjustment holes 25 are present in both the vertical portion 28 of the L-adapter 24 and in the jack housing attachment tube 30, such that the matching adjustment holes 25 is such adjacent components can be aligned, and a suitable fastening device or pin can be inserted therein to fix the relative position of the L-adapter and jack housing 22 once suitably adjusted. In addition, the horizontal portion 26 extends perpendicular to the vertical portion 28, and a reinforcement 29 is attached at the juncture of the vertical portion 28 and horizontal portion 26.

A slidable member 34 extends within the main tube 32, and is capable of movement into and out of the main tube bottom 32B. The slidable member 34 has a slidable member front 34F and a slidable member rear 34R. The slidable member rear 34R faces the jack housing attachment tube 30 and thus faces the trailer hitch 14 when the carrier is mounted to the vehicle. Thus, the slidable member apex 42 faces away from the vehicle when the carrier is mounted thereto. A triangular support member 36 is affixed to the slidable member front 34F by a lower spacer bar 38. The triangular support member 36 includes two peaked members 40 which form and apex 42. The peaked members 40 are attached to the slidable member front 34F by the lower spacer bar 38, which is attached between the peaked members 40 such that the peaked members 40 extend parallel to the slidable member front 34F, but are spaced therefrom so that they float and leave a clearance between the peaked members 40 and the main tube 32.

Also illustrated in FIG. 2, the cart attachment system 10 includes a cart adapter 41, including a V-bracket 43 which attaches over the triangular support member 36. In particular, the V-bracket 43 has a point 44 and two descending members 46 which extend downward and outward therefrom, forming an inverted "V"; Formed below each of the descending members 46 is an underside hollow 48, such that the descending members 46 have an inverted "U"-shaped cross section. The underside hollow 48, and the V-bracket 43 in general is shaped so that the triangular support member 36 fits snugly within the V-bracket 42 with the peaked members 40 extending within the underside hollow 48 and extending parallel to the descending members and the apex 42 of the triangular support member 36 corresponding with the point 44 of the V-bracket 43. In this manner, when the triangular support member 36 is lifted by raising the slidable member 34, the V-bracket 43 is lifted as well. For extra security, matching holes 25 can be provided in the peaked members and descending members so that they can be securely attached together during transport.

A pair of lateral bars 50 are attached to the descending member 46 at a nearly opposite end of the descending members 46 from the point 44. The lateral bars 50 are rigid, and slab-like in nature, extend parallel to each other, but are also angled inward toward each other—following the slope of the descending members 46 to which they are attached.

Socket tubes 52 are attached to the item to be lifted using the present invention. The socket tubes 52 have a socket tube bore 54 which is sized to allow the lateral bars 50 to extend easily therein, while holding said lateral bars snugly therein. The socket tubes 52 and the lateral bars 50 may also have matching adjustment holes 25 which allow the tubes and lateral bars 50 to be fixed to one another with a fastening device such as a pin or bolt and nut.

Figure 3:
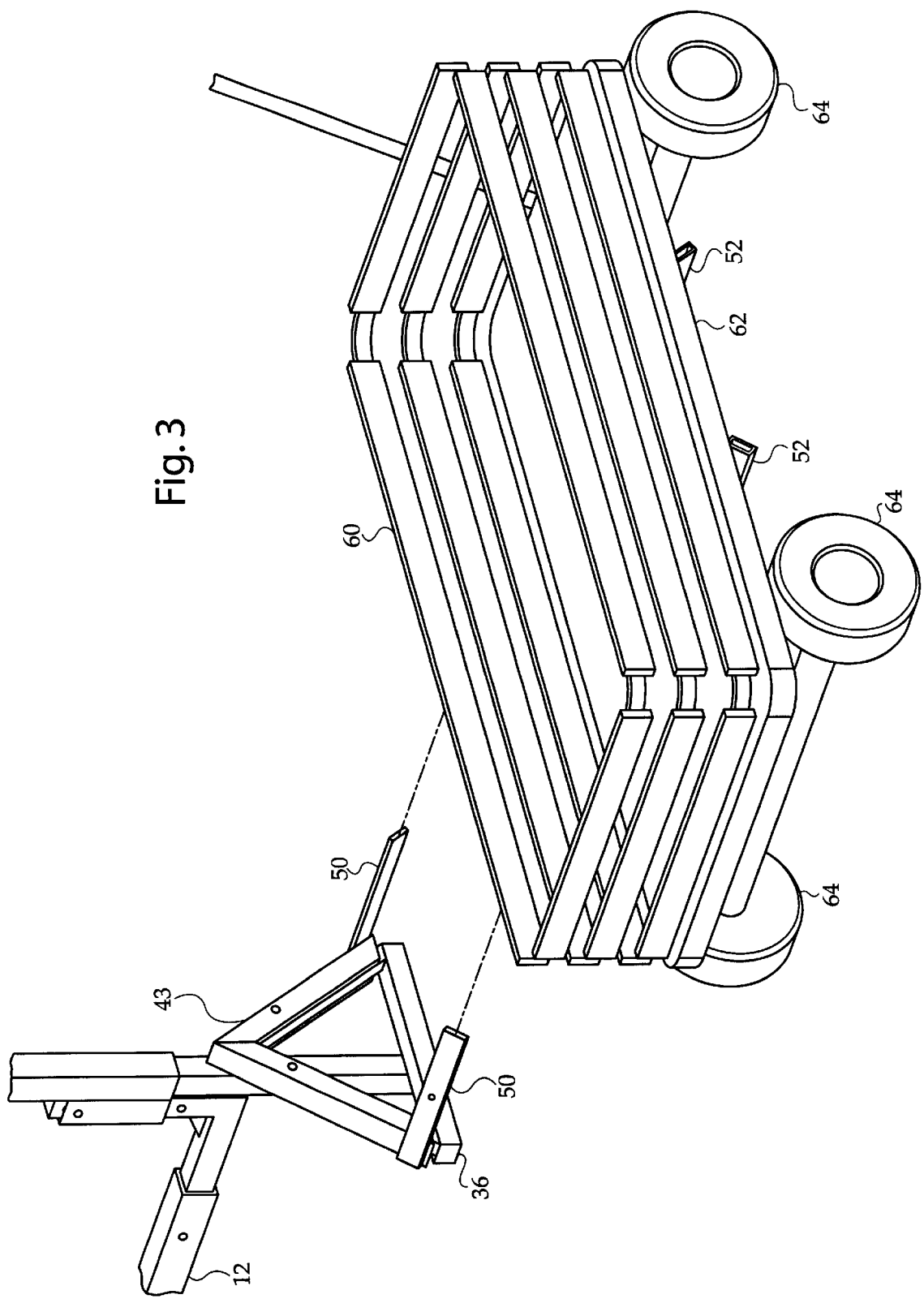
FIG. 3 is a diagrammatic perspective view of the cart adapter separated from the cart and interface with the carrier.

FIG. 3 illustrates attachment to a cart 60, having a broad platform 62, beneath which wheels 64 are located to provide mobility to the cart. According to the present invention, it is desirable to support the cart 60 behind the vehicle 12 such that the wheels 64 are raised above the ground surface upon which the vehicle 12 is traveling. Accordingly, the socket tubes 52 are mounted to the cart 60 beneath the platform. The socket tubes 52 are mounted so that they are angled like the lateral bars 50.

To attach the cart 60 to the carrier, the lateral bars 50 may be slid into the socket tubes 52 at the time of transport, wherein the V-bracket 43 is already located over the triangular support member 36 as seen in FIG. 3. Alternatively, the lateral bars 50 may be already within the socket tubes 52, and thus the V-bracket 43 is attached to the cart 60 thereby, but the V-bracket is separate from the triangular support member 36. In such a case, the cart, along with the V-bracket 43 is positioned adjacent to the triangular support member 36. The triangular support member 36 is positioned directly beneath the V-bracket 43. Then the triangular support member 36 is raised to engage the V-bracket 43 and lift the cart 60.

Figures 4, 5:
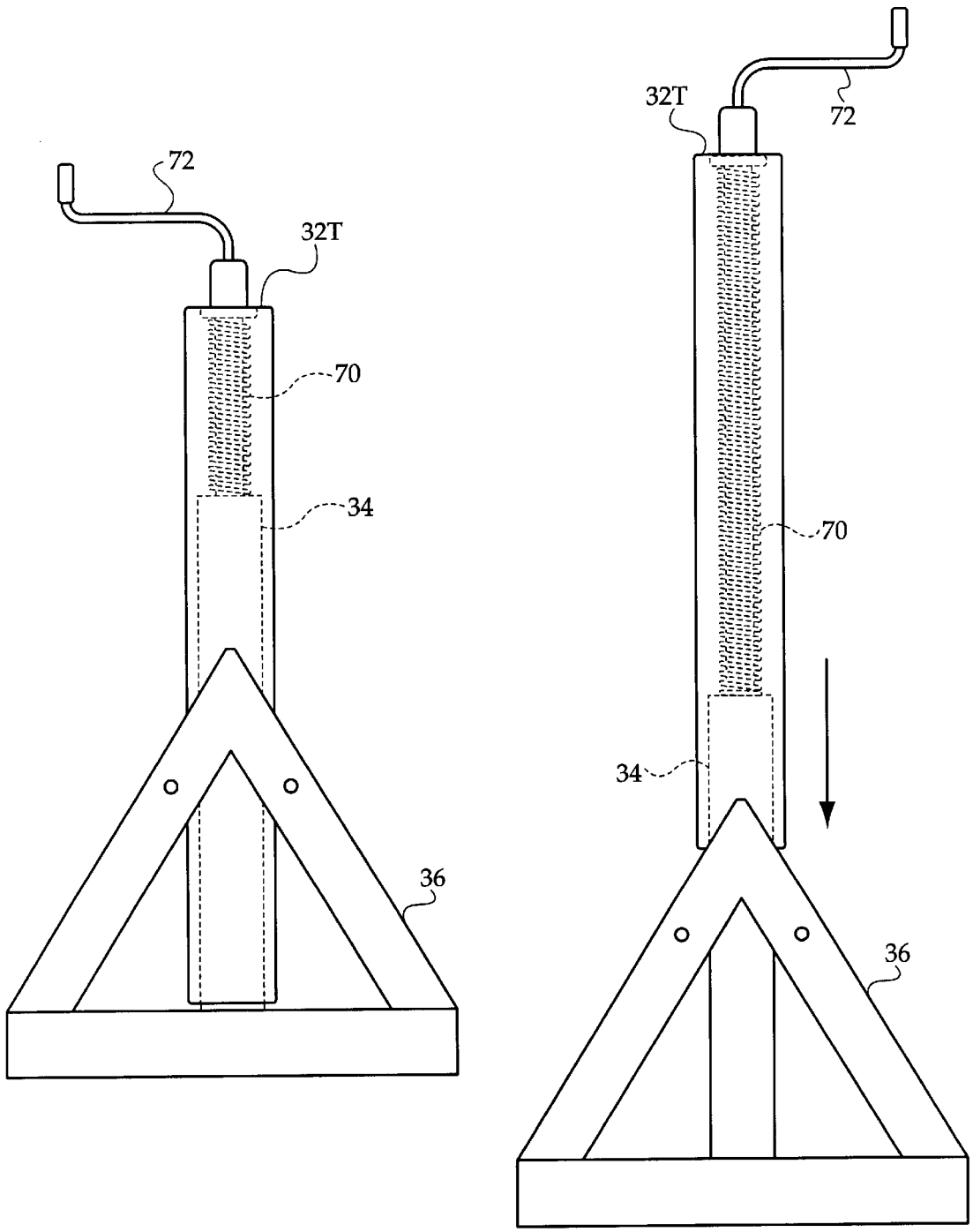
FIG. 4 is a side elevational view, illustrating internal components of the carrier which allow the triangular support member to move upward and downward.
FIG. 5 is a side elevational view, similar to FIG. 4, wherein the triangular support member has been lowered.

FIG. 4 and FIG. 5 illustrate a mechanism for raising the slidable member 34, wherein a vertical rod 70 extends downward from the main tube top 32T. The vertical rod 70 extends into the slidable member 34, such that when the. vertical rod 70 is rotated, the slidable member 34 is advanced within the main tube 32, and so is the triangular support member 36. By way of example, the vertical rod 70 may be a threaded rod, which engages a threaded attachment on the slidable member 34 to facilitate the movement thereof. To facilitate rotation of the vertical rod 70, a crank handle 72 may be provided at the main tube 32T. However, further refinements may be incorporated within the main tube to automatically or effortlessly raise or lower the slidable member 34 using hydraulic or pneumatic systems suitably configured therein.

In conclusion, herein is presented a system for attaching a cart to a vehicle, whereby the cart is attached at the vehicle trailer hitch and is raised above the ground for transport and is easily lowered to the ground once the intended destination is reached.

What is claimed is:

1. A cart attachment device, for use with a vehicle having a trailer hitch, in attaching a cart to the trailer hitch, comprising:

a carrier, the carrier having a main tube extending vertically, the carrier having a mechanism for mounting the main tube to the trailer hitch, a slidable member mounted within the main tube for vertical movement therein, and a triangular support member mounted to the slidable member, the triangular support member having two peaked members which form an apex;

a cart adapter having a V-bracket, the V-bracket attachable to the cart, having a point and a pair of descending members which extend downward and outward from the point, the descending members having an underside hollow which allows the triangular support member to extend securely within said hollow with the peaked members extending parallel to the descending members and the point of the V-bracket corresponding with the peak of the triangular support member, so that when the triangular support member is raised and lowered the V-bracket is raised and lowered therewith.

2. The cart attachment device as recited in claim 1, wherein the cart adapter further comprises a pair of lateral bars which extend horizontally from the descending members of the V-bracket, for attaching beneath the cart and supporting the cart thereby.

3. The cart attachment device as recited in claim 2, further comprising a pair of socket tubes which are attachable beneath the cart and which are sized to allow the lateral bars to slide within said socket tubes, and wherein the lateral bars extend parallel to each other.

4. The cart attachment device as recited in claim 3, wherein the mechanism for mounting the main tube to the trailer hitch, further comprises:

a jack housing attachment tube which extends parallel to the main tube and is rigidly attached to the main tube; and an L-adapter having a vertical portion which extends into the jack housing attachment tube and fastens therein, and a horizontal portion which extends into and fastens within the trailer hitch of the vehicle.

5. The cart attachment device as recited in claim 4, wherein the carrier further comprises a mechanism for raising and lowering the slidable member with respect to the main tube.

6. The cart attachment device as recited in claim 5, wherein the mechanism for raising and lowering the slidable member further comprises a vertical rod extending within the main tube which is linked to the slidable member so that when the vertical rod is rotated the slidable member is advanced upward or downward within the main tube.

7. The cart attachment device as recited in claim 6, wherein the triangular support member further comprises a lower cross member which extends between the peaked members and attaches the peaked members to the slidable member such that the peaked members are spaced from the slidable member to allow the triangular support member to extend within the underside hollow of the V-bracket, without interference with the main tube.

8. The cart attachment device as recited in claim 7, wherein the jack housing attachment tube and L-adapter have matching adjustment holes which may be selectively aligned so that a fastening device may be attached therebetween to fix the relative position of the attachment tube and L-adapter.

9. The cart attachment device as recited in claim 8, wherein the peaked members and the descending members having matching holes which may be selectively aligned to fix the triangular support member with the V-bracket.

10. The cart attachment device as recited in claim 9, wherein the socket tubes of the cart and the lateral bars of the carrier have matching holes for securely fastening the socket tubes to the lateral bars.

11. A cart attachment method, for transporting a cart using a vehicle having a trailer hitch, using a carrier having a vertically extending main tube and a horizontal portion which attaches within the trailer hitch, a slidable member within the main tube, a triangular member attached to the main tube, further using a V-bracket having an underside hollow which is sized to accommodate the V-bracket, comprising the steps of:

attaching the V-bracket to the cart;

positioning the triangular member beneath the V-bracket;

raising the triangular member so that it extends within the V-bracket; and raising the cart by further raising the triangular member.

12. The cart attachment method as recited in claim 11, wherein the V-bracket has a pair of lateral bars attached thereto and extending parallel therefrom, and wherein the step of attaching the V-bracket to the cart further comprises the steps of:

attaching a pair of socket tubes to the cart; and extending the lateral bars into the socket tubes.

\* \* \* \* \*